(12) United States Patent
Yokoe (10) Patent No.: US 10,823,294 B2
(45) Date of Patent: Nov. 3, 2020

(54) VALVE DEVICE

(71) Applicant: NIDEC SANKYO CORPORATION, Nagano (JP)

(72) Inventor: Satoru Yokoe, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 133 days.

(21) Appl. No.: 16/306,584

(22) PCT Filed: May 12, 2017

(86) PCT No.: PCT/JP2017/018016
§ 371 (c)(1),
(2) Date: Dec. 3, 2018

(87) PCT Pub. No.: WO2017/208785
PCT Pub. Date: Dec. 7, 2017

(65) Prior Publication Data
US 2019/0162314 A1    May 30, 2019

(30) Foreign Application Priority Data

Jun. 3, 2016  (JP) ................................ 2016-111988

(51) Int. Cl.
*F16K 3/08* (2006.01)
*F16K 31/04* (2006.01)
(Continued)

(52) U.S. Cl.
CPC .................. *F16K 3/08* (2013.01); *F16K 3/26* (2013.01); *F16K 31/04* (2013.01); *F16K 31/041* (2013.01);
(Continued)

(58) Field of Classification Search
CPC ... F16K 3/08; F16K 3/085; F16K 3/26; F16K 3/262; F16K 31/04; F16K 31/041;
(Continued)

(56) References Cited

U.S. PATENT DOCUMENTS

2012/0080623 A1    4/2012  Kang
2015/0276070 A1*  10/2015  Yokoe ................... F16K 3/085
                                                                251/248

FOREIGN PATENT DOCUMENTS

CN    102141171    8/2011
CN    104704273    6/2015
(Continued)

OTHER PUBLICATIONS

"International Search Report (Form PCT/ISA/210)" of PCT/JP2017/018016, dated Jul. 18, 2017, with English translation thereof, pp. 1-2.

(Continued)

*Primary Examiner* — Hailey K. Do
(74) *Attorney, Agent, or Firm* — JCIPRNET (57) ABSTRACT

A valve device is provided with a valve body driving member rotated by driving force from a drive source, and a valve body rotating in a circumferential direction integrally with the valve body driving member. Fitting parts fitted one another are formed in the lower surface of the valve body driving member and the upper surface of the valve body. The valve body has hole parts formed therethrough in the axial direction thereof. Groove parts that are flow channels linking from the outer peripheral surface of the valve body to the hole parts are formed in the upper surface of the valve body. The fitting parts and the groove parts on the valve body side have connecting parts that are portions where the fitting parts and the groove parts are formed continuously in the (Continued)

upper surface of the valve body without being separated by other elements constituting the valve body.

19 Claims, 9 Drawing Sheets

(51) Int. Cl.
| | |
|---|---|
| *F16K 31/53* | (2006.01) |
| *F16K 3/26* | (2006.01) |
| *F25B 41/06* | (2006.01) |
| *F25B 41/04* | (2006.01) |
| *F16K 5/04* | (2006.01) |

(52) U.S. Cl.
CPC ............ *F16K 31/535* (2013.01); *F25B 41/06* (2013.01); *F16K 3/085* (2013.01); *F16K 5/0414* (2013.01); *F25B 41/04* (2013.01); *F25B 41/062* (2013.01)

(58) Field of Classification Search
CPC ........... F16K 31/535; Y10T 137/86533; Y10T 137/86541; Y10T 137/86911
See application file for complete search history.

(56) References Cited

FOREIGN PATENT DOCUMENTS

| | | |
|---|---|---|
| CN | 105276229 | 1/2016 |
| CN | 105190136 | 2/2017 |
| JP | 5615993 | 10/2014 |
| JP | 2015190483 | 11/2015 |

OTHER PUBLICATIONS

"Office Action of China Counterpart Application", dated Jun. 27, 2019, p. 1-p. 6.

* cited by examiner

VALVE DEVICE

CROSS-REFERENCE TO RELATED APPLICATION

This application is a 371 application of the International PCT application serial no. PCT/JP2017/018016, filed on May 12, 2017, which claims the priority benefit of Japan Patent Application No. 2016-111988, filed on Jun. 3, 2016. The entirety of each of the abovementioned patent applications is hereby incorporated by reference herein and made a part of this specification.

BACKGROUND OF THE INVENTION

Technical Field

The present invention relates to a valve device.

Related Art

The patent literature 1 below discloses a valve device which is interposed in refrigerant flow channels inside a refrigerator and adjusts the flow rate of the refrigerant by a valve body.

LITERATURE OF RELATED ART

Patent Literature

Patent literature 1: Japanese Patent No. 5615993

SUMMARY

Problems to be Solved

The valve device in patent literature 1 covers refrigerant outlets of a valve chamber by a disk-shaped valve body, and the refrigerant outlets are opened and closed by turning the valve body in a circumferential direction. In each position in the circumferential direction of the valve body, the cutout part from which the entire refrigerant outlet is exposed in the valve chamber are formed, or small holes with a small diameter are formed therethrough in the thickness direction of the valve body. The valve body adjusts the outflow amount of the refrigerant by aligning the locations at which the cutout part or the small holes are formed to the positions of the refrigerant outlets.

The outflow amount of the refrigerant can be more finely adjusted using the same configuration as the valve device in patent literature 1 as long as a plurality of small holes with different diameters are provided to the valve body. The upper limit number of the small holes possible to be formed in the valve body is determined by the diameter or an end surface area of the valve body. On the upper surface of the valve body, it is necessary to arrange flow channels (for example, cutout parts 73 on the gear side in patent literature 1) which communicate the small holes with the valve chamber, or to arrange linking parts (for example, fitting concave portions 70, 71, 72 in patent literature 1) of the valve body and a driving member thereof. Therefore, when the valve body is small, a space capable of small hole formation is limited.

In view of such problems, the problem to be solved in the present invention is to provide a valve device in which more small holes can be provided to a valve body, and with which the flow rate of a fluid can be finely adjusted even when a small valve body is used.

Means to Solve the Problems

In order to solve the problem, a valve device of the present invention includes a drive source; a valve body driving member that is rotated by a driving force from the drive source; a valve body that is fixed to one end surface in an axial direction of the valve body driving member and rotates in a circumferential direction integrally with the valve body driving member; and a valve seat having a valve seat surface where the valve body is disposed. When a surface of the valve body driving member facing the valve body is set as a lower surface of the valve body driving member, a surface of the valve body facing the valve body driving member is set as an upper surface of the valve body, and an end surface that is opposite to the upper surface of the valve body and is disposed on the valve seat surface is set as a lower surface of the valve body, fitting parts fitted one another are formed in the lower surface of the valve body driving member and the upper surface of the valve body, the valve body has hole parts formed therethrough in the axial direction of the valve body, opening parts that are inflow ports or outflow ports of a fluid are formed in the valve seat surface of the valve seat, groove parts that are flow channels linking from an outer peripheral surface of the valve body to the hole parts are formed in the upper surface of the valve body, and the fitting parts and the groove parts on a side of the valve body have connecting parts that are portions where the fitting parts and the groove parts are formed continuously in the upper surface of the valve body without being separated from other elements constituting the valve body.

By continuously forming the fitting parts and the groove parts in the upper surface of the valve body, a space capable of arranging the hole parts can be increased.

In addition, the fitting parts are preferably constituted by concave portions and convex portions that are fitted one another, and furthermore, the fitting parts of the valve body are preferably concave portions.

By setting the fitting parts of the valve body as concave portions, the shape of the upper surface of the valve body can be flattened, and the materials necessary for the shaping of the valve body can be reduced.

Besides, preferably, the concave portions that are the fitting parts of the valve body overlap partially with the groove parts.

Besides, preferably, the valve body has a plurality of the hole parts with different hole diameters, and the groove parts are formed in each of the hole parts in the upper surface of the valve body.

By arranging a plurality of hole parts with different hole diameters, fine adjustment of flow rate can be realized.

Besides, the concave portions that are the fitting parts on the side of the valve body are preferably connected to a plurality of the groove parts.

By connecting a plurality of groove parts to the concave portion, a space for arranging more hole parts can be secured.

Besides, preferably, any one of the plurality of hole parts is arranged in a position which substantially becomes a radius center on the upper surface of the valve body.

By arranging the hole parts in the substantially radius center of the valve body, the sealing performance of the lower surface of the valve body and the valve seat surface of the valve seat can be further improved.

Besides, preferably, the fitting parts are constituted by a plurality of groups of concave portions and convex portions that are fitted one another, and at least one of the plurality of concave portions that are the fitting parts on the side of the valve body has the connecting part.

By arranging a plurality of groups of the fitting parts, the valve body driving member and the valve body can be integrally rotated in a more reliable way.

Besides, preferably, support parts, which support the lower surface of the valve body driving member, are arranged on an outside in the radial direction of the concave portions which are formed in the upper surface of the valve body and are the fitting parts having the connecting parts.

By arranging the support parts on the outside in the radial direction of the concave portion, the sealing performance of the lower surface of the valve body and the valve seat surface of the valve seat can be further improved.

Besides, preferably, a cutout part that is a flow channel obtained by cutting the lower surface of the valve body from the outer peripheral surface of the valve body to a center side in the radial direction is formed in the lower surface of the valve body, and the cutout part has a size capable of exposing all the opening parts in the valve seat surface when the valve body reaches a predetermined angle position.

By arranging the cutout part in the valve body, the fluid can circulate at a maximum flow rate ignoring the flow rate limitation effect of valve body.

Besides, preferably, among the plurality of concave portions that are the fitting parts of the valve body, the concave portions arranged in the upper surface of the valve body and in an upper part of a forming range of the cutout parts are through holes penetrating to a side of the cutout part, and the convex portions of the valve body driving member, which are fitted to the concave portions that are the through holes, are caulked on the cutout part side and are fixed to the valve body.

By fixing the convex portions of the valve body driving member to the valve body, rattling between the valve body driving member and the valve body can be prevented.

Besides, preferably, the diameter of the valve body is less than 10 mm, the hole parts that the valve body has have five different hole diameters, the groove parts are formed in each of the hole parts in the upper surface of the valve body, the fitting parts are constituted by a plurality of groups of concave portions and convex portions that are fitted one another, at least one of the plurality of concave portions that are the fitting parts on the side of the valve body side has the connecting part, a cutout part that is a flow channel obtained by cutting the lower surface of the valve body from the outer peripheral surface of the valve body to a center side in the radial direction is formed in the lower surface of the valve body, the cutout part has a size capable of exposing the entire the opening part in the valve seat surface when the valve body reaches a predetermined angle position, and the valve body has, in the lower surface thereof, a flat surface part which closes all the opening parts in the valve seat surface.

According to the configuration, the flow rate of a fluid can be finely adjusted even when a small valve body is used.

Besides, preferably, error absorbing parts, which are concave portions that use the hole parts as radial centers and have diameters larger than hole diameters of the hole parts, are formed in the lower surface of the valve body.

By including the error absorbing parts in the hole parts, slight deviation in the rotation angle of the valve body is absorbed, and the accuracy of the flow rate adjustment by the hole parts is increased.

Besides, preferably, the diameter of each error absorbing part is determined in accordance with the hole diameter of the corresponding hole part.

By forming the error absorbing part with a small diameter accordingly in the hole part with a small hole diameter, and forming the error absorbing part with a large diameter accordingly in the hole part with a large hole diameter, the area efficiency of the lower surface of the valve body is improved, and more hole parts can be arranged in the valve body.

Besides, preferably, a depth of the error absorbing part is deeper than the hole diameter of the corresponding hole part.

By the error absorbing part being deeper than the hole diameter of the corresponding hole part, the flow rate can be prevented from being limited by the error absorbing part, and the accuracy of the flow rate adjustment by the hole part can be increased.

Besides, preferably, a plurality of groups of concave portions and convex portions constituting the fitting parts are arranged at unequal intervals in the circumferential direction of the valve body driving member and the valve body.

By arranging a plurality of groups of fitting parts at unequal intervals in the circumferential direction of the valve body driving member and the valve body, incorrect assembling of the valve body driving member and the valve body is avoided, and the relative assembling angle of these members can always be fixed.

Besides, preferably, at least any one of the valve seat surface of the valve seat and the lower surface of the valve body is ground.

By grinding the valve seat surface of the valve seat and/or the lower surface of the valve body to smoothen the surface, the sealing performance of the valve seat surface and the lower surface can be improved.

Besides, preferably, the drive source is a motor, the valve body driving member is a gear member in which a teeth portion is formed in an outer peripheral surface of the valve body driving member, and a driving force from the drive source is decelerated and transmitted to the valve body driving member.

By setting the valve body driving member itself as a gear member, the component number of the flow rate adjustment mechanism is reduced, and the valve device can be miniaturized.

Besides, preferably, a polyphenylene sulfide resin is used in the material of the valve body, and a nylon resin is used in the material of the valve body driving member.

By using the polyphenylene sulfide resin which has high formability and excellent abrasion resistance in the material of the valve body that influences the adjustment accuracy of the fluid flow rate, and on the other hand, using inexpensive nylon resin in the valve body driving member which does not require the formation accuracy as the valve body, the cost efficiency is increased.

Effect

According to the valve device of the present invention, more small holes can be arranged to the valve body, and the flow rate of a fluid can be finely adjust even when a small valve body is used.

DESCRIPTION OF THE EMBODIMENTS (Overall Configuration)

Figure 1A:
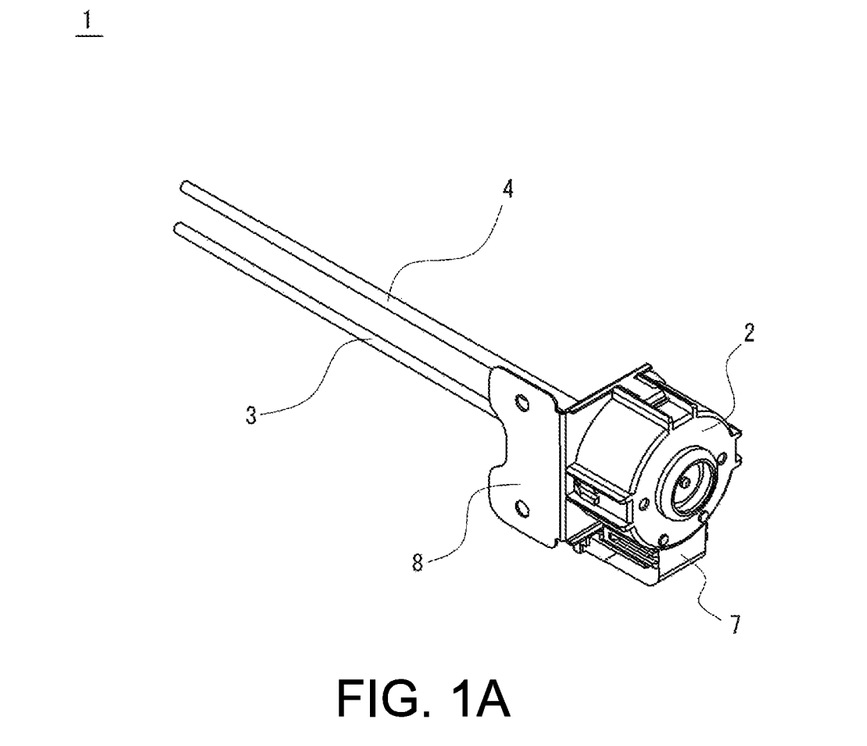
FIG. 1 is a perspective view of a refrigerant valve device of an embodiment.
Figure 1B:
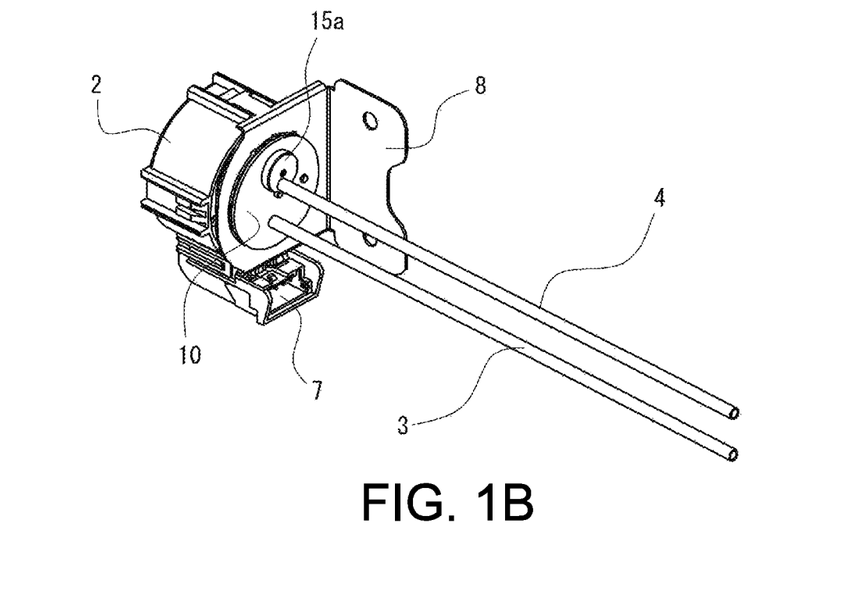

Next, a refrigerant valve device serving as an embodiment of a valve device of the present invention is described in detail using the drawings. FIG. 1 is a perspective view showing the appearance of a refrigerant valve device 1 of the embodiment. The refrigerant valve device 1 is disposed between a compressor and a cooler in refrigerant flow channels within a refrigerator and adjusts a flow rate of a refrigerant circulating within the refrigerator. In addition, the application of the valve device of the present invention is not limited to the adjustment of refrigerant flow rate, and is applicable to a wide range of machines with the aim of controlling a flow rate of a fluid.

The refrigerant valve device 1 includes a valve body 2, an inflow pipe 3 that introduces a refrigerant that is a fluid into the valve body 2, an outflow pipe 4 which makes the introduced refrigerant flow out of the valve body 2, a connector 7 that is electrically connected to an external control device, and a mounting plate 8 for fixing the refrigerant valve device 1 into the refrigerator. In the description below, a direction in parallel to an extending direction of the inflow pipe 3 and the outflow pipe 4 is set as a vertical direction, taking the valve body 2 side as an upper side and the inflow pipe 3 and outflow pipe 4 side as a lower side.

Figure 2:
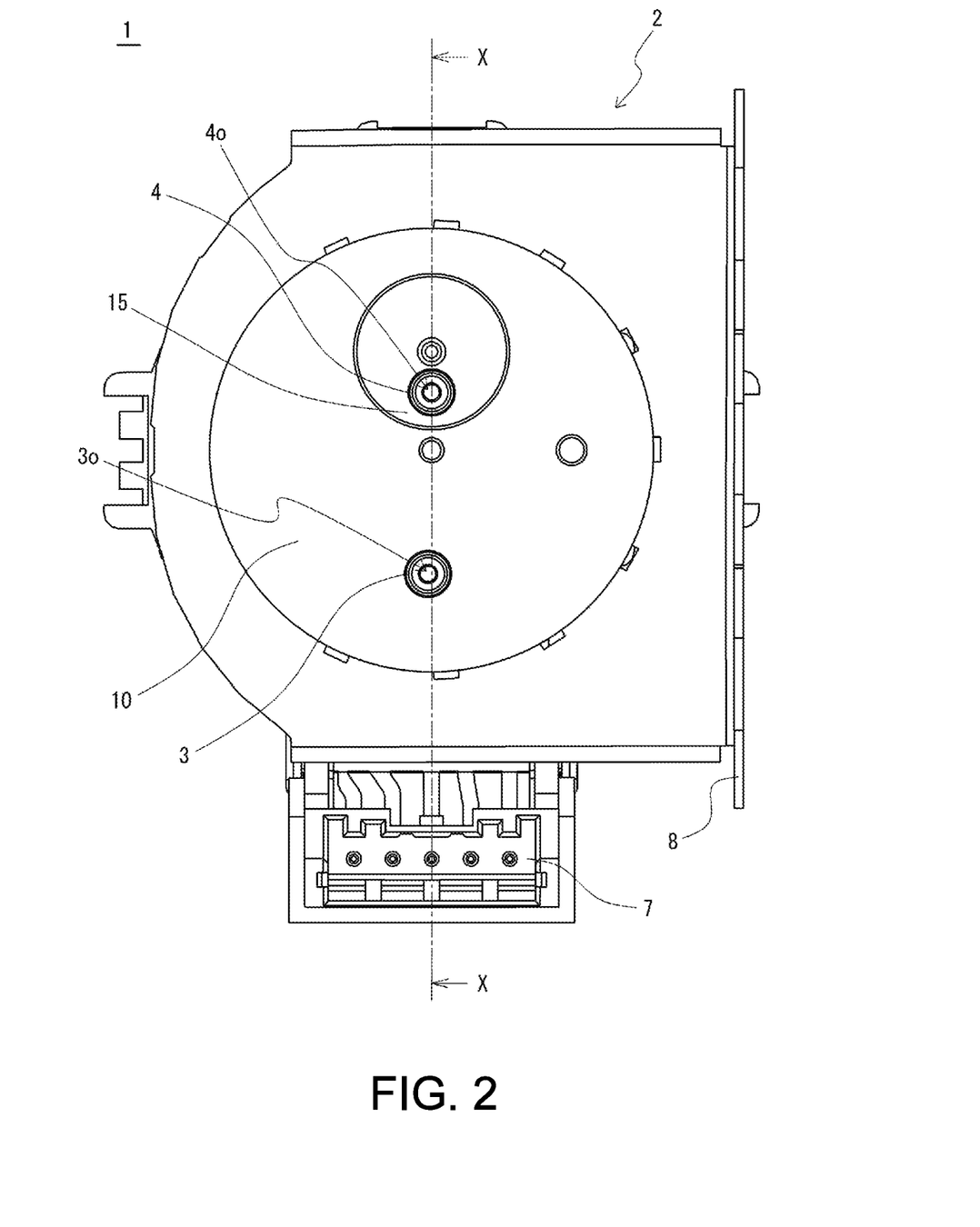
FIG. 2 is a bottom plan view of a refrigerant valve device.

FIG. 2 is a bottom plan view of the refrigerant valve device 1 when the refrigerant valve device 1 is viewed from the inflow pipe 3 and outflow pipe 4 side. A lower surface of a disk-shaped base 10 is exposed from the bottom portion of the valve body 2. A valve seat 15 is fitted to the base 10, the outflow pipe 4 is connected to an outflow port 4o of the valve seat 15, and the inflow pipe 3 is connected to an inflow port 3o of the base 10.

Figure 3:
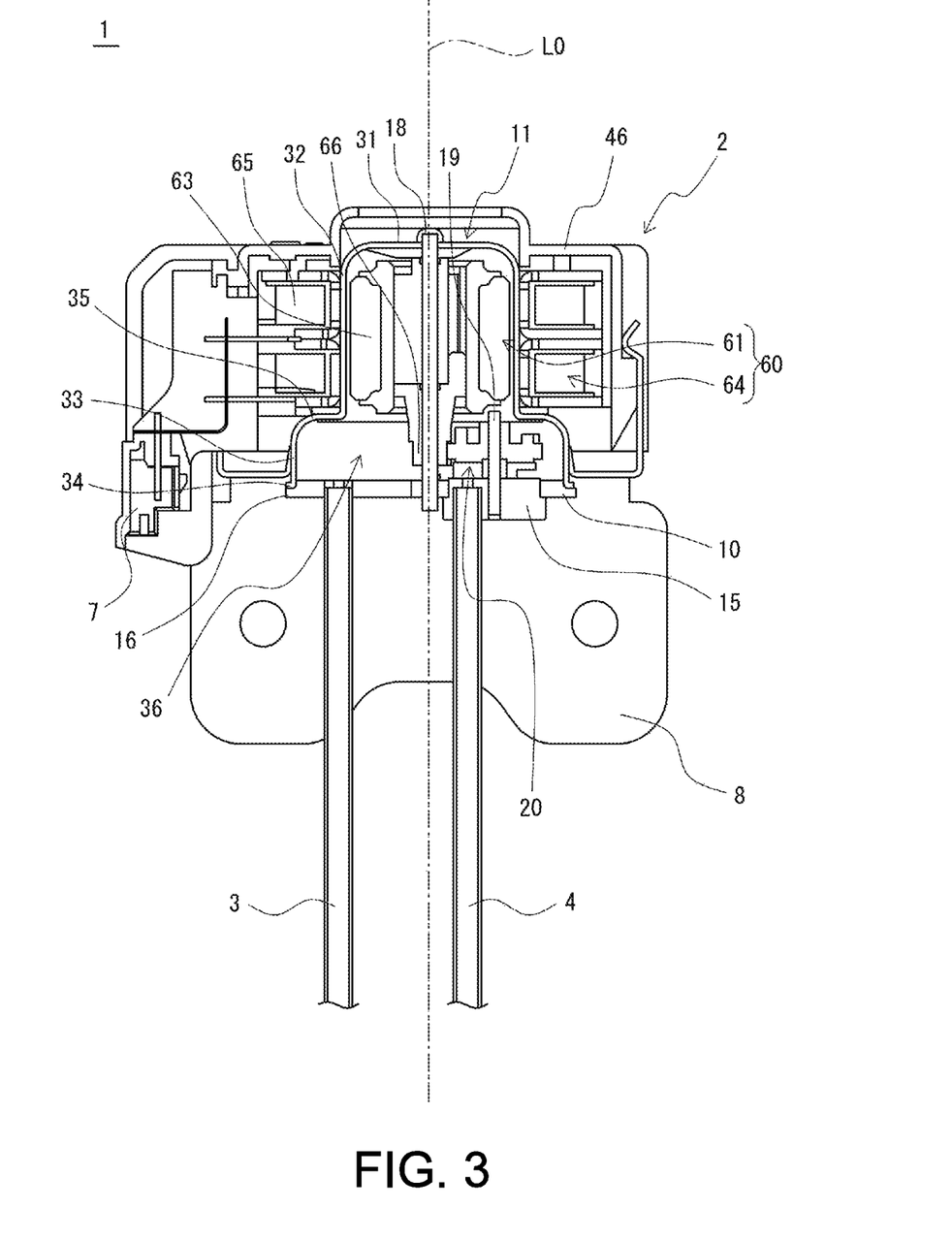
FIG. 3 is a cross-sectional view of the refrigerant valve device along an X-X line in FIG. 2.

FIG. 3 is a cross-sectional view obtained by cutting the refrigerant valve device 1 along an X-X line in FIG. 2. As shown in FIG. 3, inside an outer case 46 of the valve body 2, the valve body 2 has the base 10 and a sealing cover 11 that is a cup-shaped case body which opens downward and covers the base 10 from above.

The sealing cover 11 is a member formed by pressing a non-magnetic stainless plate material. From the upper side toward the lower side, the sealing cover 11 includes a circular bottom portion 31, a small-diameter tubular portion 32 extending downward from an outer periphery of the bottom portion 31, a large-diameter tubular portion 33 with a diameter larger than the diameter of the small-diameter tubular portion 32, and a cover-side flange 34 which extends radially outward from a lower end edge (opening edge) of the large-diameter tubular portion 33. Between the small-diameter tubular portion 32 and the large-diameter tubular portion 33, an annular portion 35, which extends toward a direction orthogonal to an axis line L0 passing through the center of the base 10 and connects the small-diameter tubular portion 32 to the large-diameter tubular portion 33, is arranged. A base-side flange 16, in which a plate thickness of the base 10 is lessened by lowering the surface position of the upper surface of the base 10 in a step shape, is formed on the peripheral portion of the base 10. The sealing cover 11 and the base 10 are fixed in a state that the cover-side flange 34 abuts against the base-side flange 16. The inner surface of the sealing cover 11 and the upper surface of the base 10 define a valve chamber 36 that is a flow channel where the refrigerant is stored.

Besides, a stepping motor 60, which is a drive source formed by using the interior and exterior of the sealing cover 11, is accommodated within the outer case 46. A rotor 61 serving as an output part of the stepping motor 60 and a pinion 66 of the stepping motor 60 are arranged within the sealing cover 11. The rotor 61 includes a permanent magnet 63 in the outer peripheral surface of the rotor 61, and is rotatably supported by a rotor spindle 18. An upper end of the rotor spindle 18 is fixed to the bottom portion 31 of the sealing cover 11, and a lower end of the rotor spindle 18 is fixed to the center of the base 10. An axis line of the rotor spindle 18 is consistent with the axis line L0, and extends in parallel to an axis line L1 of the spindle 19 rotatably supporting a valve body driving member 50 and the valve body 20 that are described below.

A stator 64 of the stepping motor 60 is disposed on the annular portion 35 of the sealing cover 11, and is circularly arranged along the shape of the small-diameter tubular portion 32 of the sealing cover 11. The stator 64 includes a coil 65, and the coil 65 faces the permanent magnet 63 of the rotor 61 through the small-diameter tubular portion 32 of the sealing cover 11. The coil 65 is electrically connected to the connector 7, and operations of the stepping motor 60 are controlled by an external control device connected through the connector 7.

(Flow Rate Adjustment Mechanism)

Figure 4:
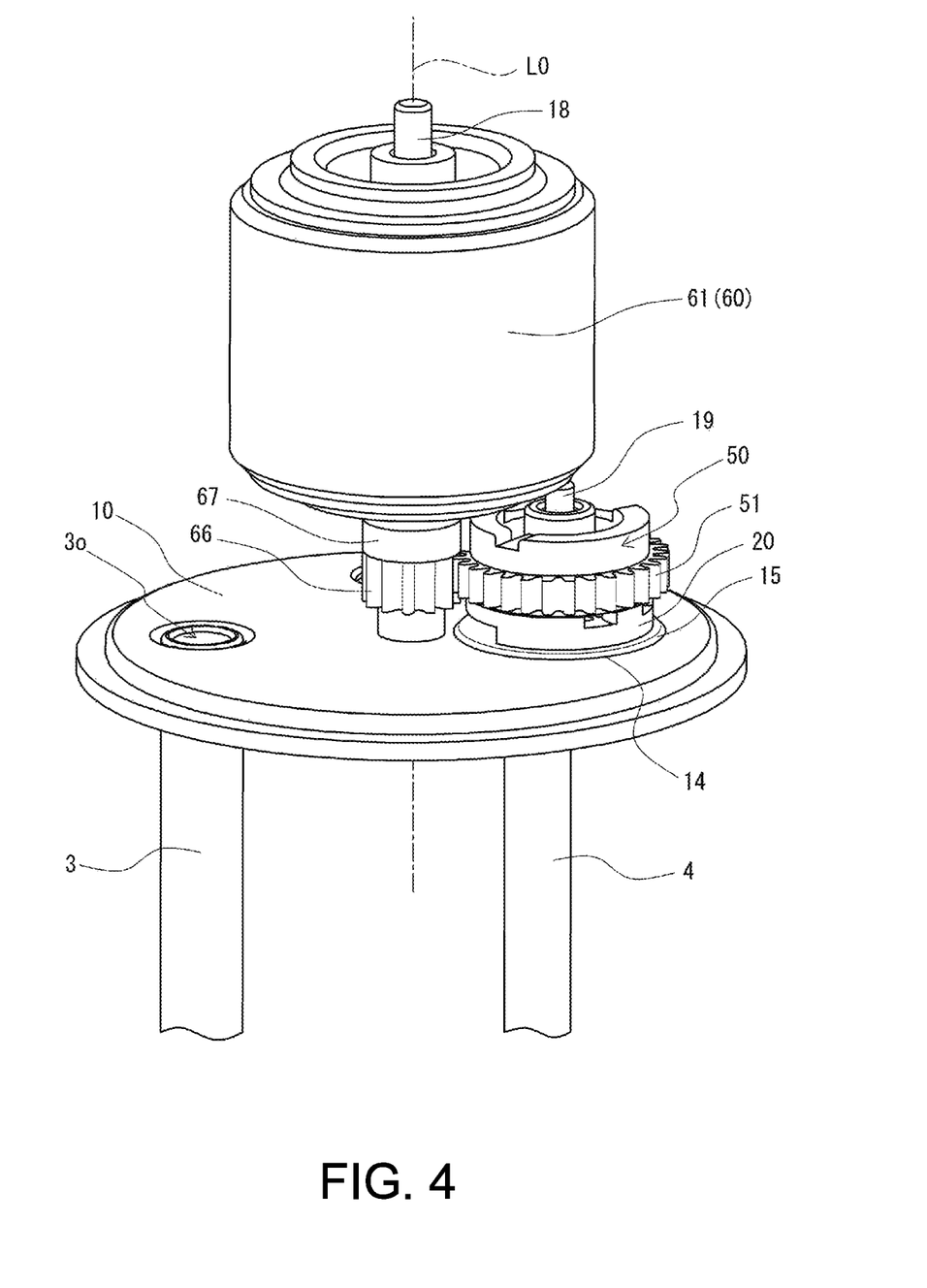
FIG. 4 is a perspective view showing main parts of a flow rate adjustment mechanism of a refrigerant valve device.
Figure 5A:
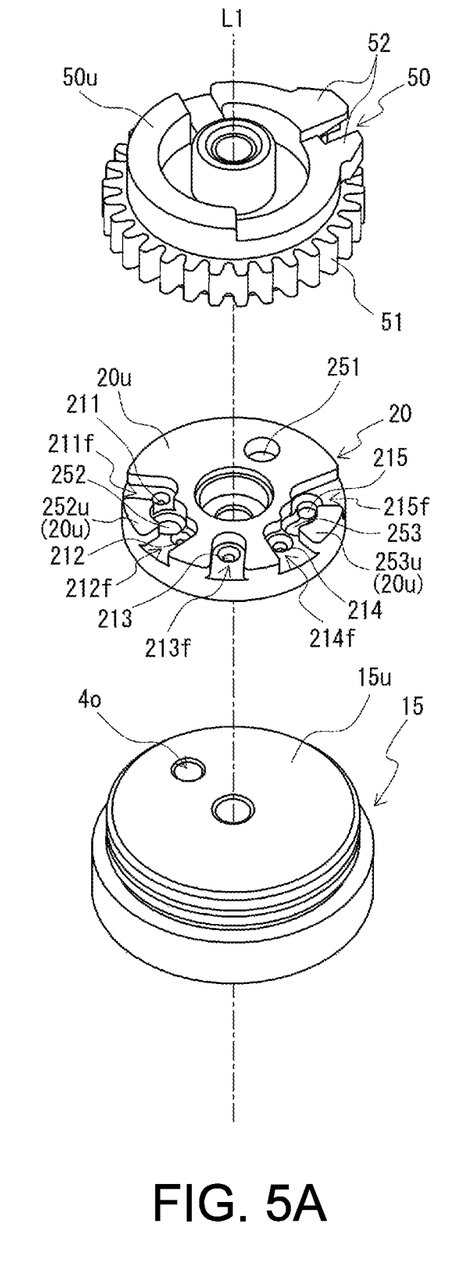
FIGS. 5A and 5B are an exploded perspective view of a valve body driving member, a valve body, and a valve seat.
Figure 5B:
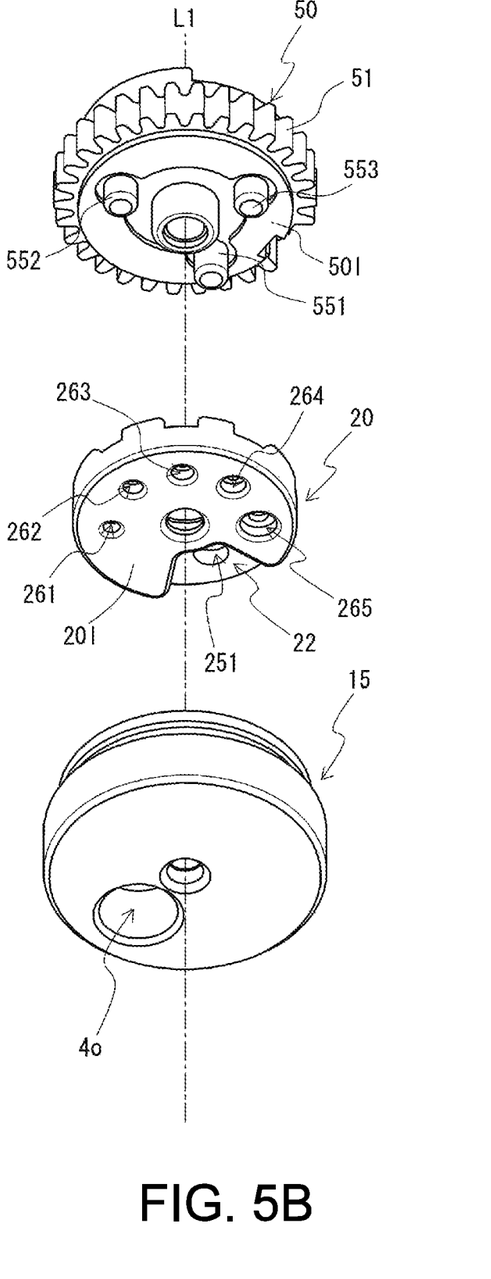

FIG. 4 is a perspective view showing main parts of a flow rate adjustment mechanism of the refrigerant valve device 1. FIGS. 5A and 5B are an exploded perspective view of the valve body driving member 50, the valve body 20, and the valve seat 15. FIG. 5A is a drawing in which these parts are view from above, and FIG. 5B is a drawing in which these parts are view from below.

As shown in FIG. 4 and FIGS. 5A-5B, the flow rate adjustment mechanism of the refrigerant valve device 1 is constituted by the stepping motor 60 shown in FIG. 4 as the rotor 61, the valve body driving member 50, the valve body 20, and the valve seat 15. Among these, the valve body driving member 50, the valve body 20, and the valve seat 15 are sequentially arranged from the upper side to the lower side along the axis line L1 which is a common axis line.

The valve body driving member 50 is a gear member having a teeth portion 51 formed on the outer peripheral surface of the valve body driving member 50, and the teeth portion 51 meshes with the pinion 66 of the stepping motor 60. The rotation of the stepping motor 60 is decelerated via the pinion 66 and the teeth portion 51 and is transmitted to the valve body driving member 50. The valve body driving member 50 of the embodiment itself is a gear member provided with the teeth portion 51, and thereby the component number of the flow rate adjustment mechanism is suppressed, and the refrigerant valve device 1 can be miniaturized.

Figure 7A:
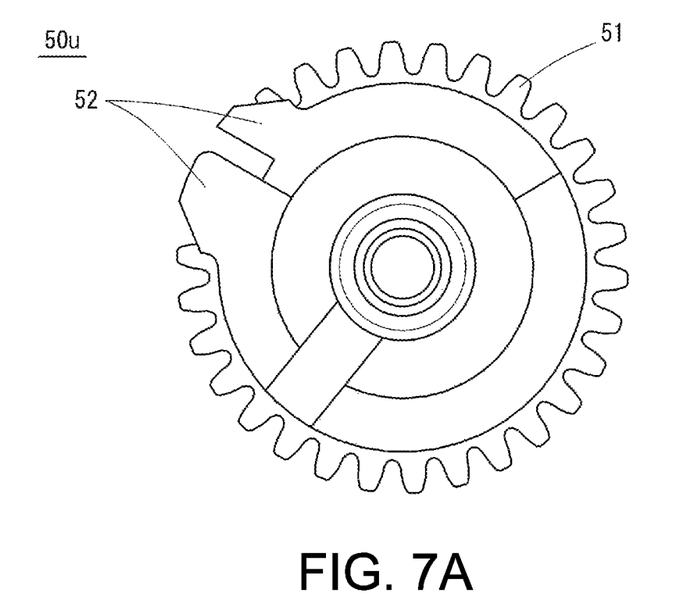
FIGS. 7A and 7B are a top view and a bottom view showing the structure of a valve body driving member.
Figure 7B:
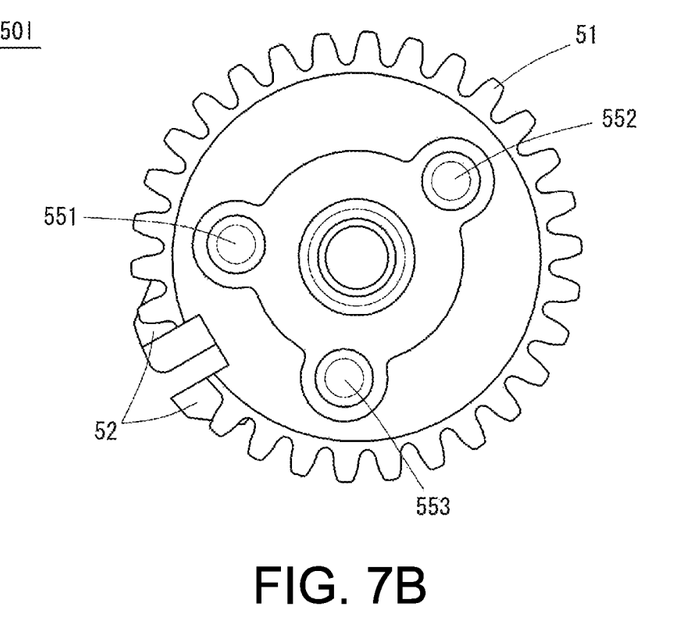

Moreover, as shown in FIG. 7, an arm portion 52 that radially protrudes outward from a portion in the circumferential direction of the valve body driving member 50 is formed on the valve body driving member 50. When the valve body driving member 50 rotates and reaches a predetermined angle position, the arm portion 52 abuts against a rotation regulation part 67 included in the rotor 61 from one side or the other side around the axis line L1 and limits the rotation angle of the valve body driving member 50 and the valve body 20 within a predetermined range.

Among the end surfaces of the valve body driving member 50, convex portions 551, 552, 553 that are fitting parts protruding toward the valve body 20 side are formed on a lower surface 50I, which is the surface facing the valve body 20, along the circumferential direction at unequal intervals. In the followings, the three convex portions are also generally called "the convex portion 55". Among the end surface of the valve body 20, in an upper surface 20u which is the surface facing the valve body driving member 50, concave portions 251, 252, 253 that are fitting parts to which the convex portion 55 is fitted are formed in positions corresponding to the convex portion 55 of the valve body driving member 50. In the followings, the three concave portions are also generally called "the concave portion 25". By the fitting of the plurality groups of fitting parts, the valve body 20 rotates integrally with the valve body driving member 50 in the circumferential direction. Besides, by arranging the plurality groups of fitting parts along the circumferential direction of the valve body driving member 50 and the valve body 20 at unequal intervals, incorrect assembling of the valve body driving member 50 and the valve body 20 is prevented, and the relative assembling angle of these members can always be fixed. In this way, the valve body 20 and the valve body driving member 50 of the embodiment are prevented from deviating in the circumferential direction by the axial overlapping of at least one portion thereof with the other member.

Besides, among the concave portion 25 of the valve body 20, the concave portion 251 is formed as a through hole which penetrates on the cutout part 22 side. And in the convex portion 551 fitted to the concave portion 251, a front end portion is exposed on the cutout part 22 side, and a front end portion of the exposed convex portion 551 is caulked on the cutout part 22 side. Accordingly, the valve body 20 is fixed to the lower surface 50I of the valve body driving member 50 without rattling, and the valve body driving member 50 can control the angle position of the valve body 20 at a high accuracy.

The valve seat 15 is arranged beneath the valve body 20, and the valve body 20 is disposed on the valve seat 15. A valve seat mounting part 14 that is an opening part to which the valve seat 15 is fitted is formed in the base 10. The valve seat 15 is a substantially cylindrical member, and a valve seat surface 15u consisting of a flat surface is arranged on the upper surface of the valve seat 15. An outflow port 4o, which is a penetrated opening part from which the refrigerant flows out, is formed in the valve seat 15 in a position deviating radially outward from the axis line L1. The valve seat surface 15u constitutes a portion of the upper surface of the base 10.

The valve body 20 is a disk-shaped member with a diameter of 8 mm, and is disposed on the valve seat 15 in a manner the lower surface 20I contacts the valve seat surface 15u. The valve body driving member 50 receives driving force of the stepping motor 60 to rotate, and thereby the valve body 20 rotates the lower surface 20I while sliding the lower surface 20I on the valve seat surface 15u. In this way, a switching is made between a state that the outflow port 4o of the valve seat surface 15u is blocked and a state that the entire or part of the outflow port 4o communicates with the valve chamber 36.

The lower surface 20I of the valve body 20 and the valve seat surface 15u of the valve seat 15 are ground to be flat. In this way, the sealing performance of the lower surface 20I of the valve body 20 and the valve seat surface 15u is increased, and the refrigerant is prevented from leaking from a gap in the contacting surface thereof. Furthermore, when the valve body driving member 50 and the valve body 20 are fixed, a front end of the convex portion 551 is caulked by the cutout part 22, so that abrasion or deformation caused by caulking operation is prevented from occurring in the lower surface 20I of the ground valve body 20. In addition, in the embodiment, both the lower surface 20I of the valve body 20 and the valve seat surface 15u of the valve seat 15 are ground. However, the corresponding leakage prevention effect is also obtained even if only one of the surfaces is ground.

(Structure of Valve Body)

Figure 6A:
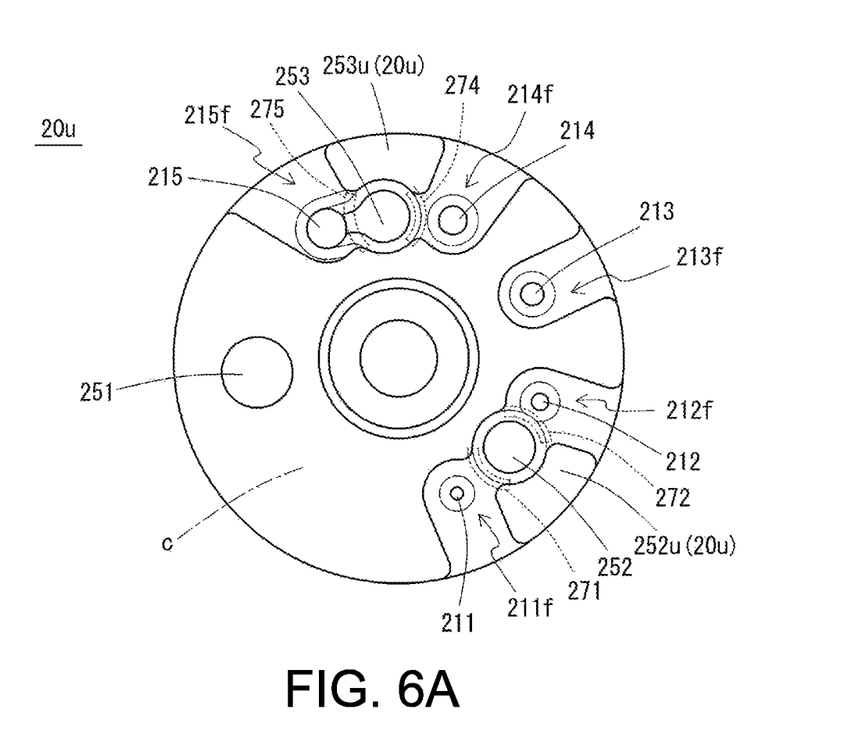
FIGS. 6A and 6B are a top view and a bottom view showing the structure of a valve body.
Figure 6B:
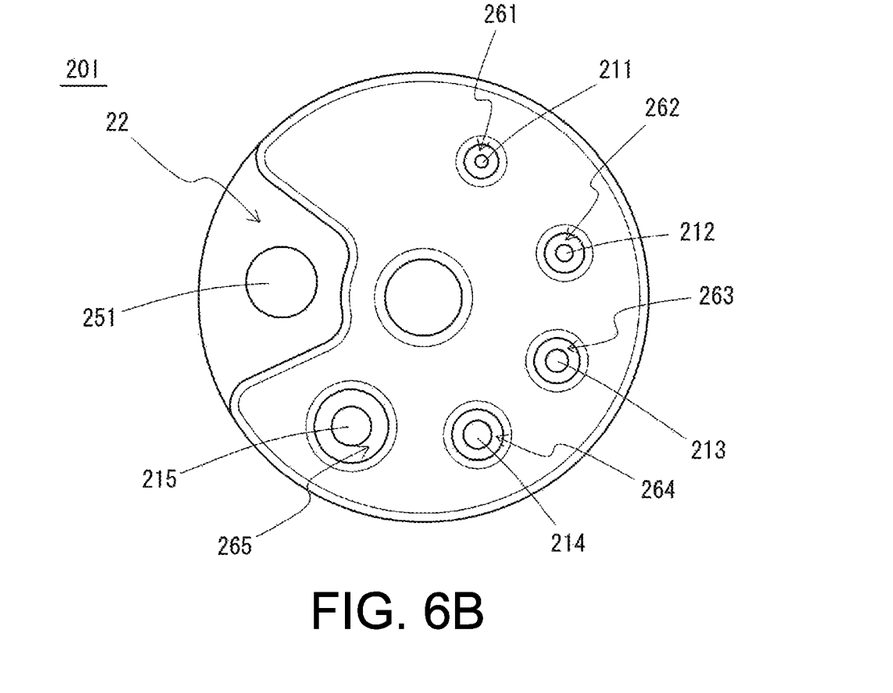

Next, the structure of the valve body 20 is described in more detail with reference to FIGS. 6A and 6B. FIGS. 6A and 6B are drawings showing the structure of the valve body 20. FIG. 6Aa is a top view of the valve body 20, and FIG. 6B is a bottom view of the valve body 20.

The valve body 20 has small hole parts 211, 212, 213, 214, 215, which are five hole parts penetrating through in the axial direction of the valve body 20. In the followings, the five small hole parts are also generally called "the small hole part 21". The hole diameter of these small hole parts 21 increases gradually from the small hole part 211 in a manner that the hole diameter of the small hole part 211 is the smallest and the hole diameter of the small hole part 215 is the largest. The valve body 20 of the embodiment can finely adjust the flow rate by including a plurality of small hole parts with different hole diameters.

Besides, the cutout part 22, which is a refrigerant flow channel obtained by cutting the lower surface 20I from the outer peripheral surface of the valve body 20 to the radial center side, is formed in the lower surface 20I of the valve body 20. The cutout part 22 has a size capable of exposing all the outflow ports 4o in the valve seat surface 15u when the valve body 20 reaches a predetermined angle position. By the valve body 20 including the cutout part 22, the refrigerant can circulate at a maximum flow rate ignoring the limitation effect of the valve body 20.

Groove parts 211f, 212f, 213f, 214f, 215f, which are flow channels of the refrigerant linking from the outer peripheral surface of the valve body 20 to each small hole part 21, are formed in the upper surface 20u of the valve body 20. In the followings, the five groove parts are also generally called "the groove part 21f". Connecting parts 271, 272, which are portions that are continuously formed without being separated by other elements constituting the valve body 20 (portions where the concave portion 252 and a part of the groove parts 211f, 212f overlap), are arranged between the concave portion 252 and the groove parts 211f, 212f and in the upper surface 20u of the valve body 20. Similarly, connecting parts 274, 275 are arranged between the concave portion 253 and the groove parts 214f, 215f. In the followings, the four connecting parts are also generally called "the connecting part 27".

In a normal design concept, when concave portions or groove parts as in the present invention are arranged in the upper surface of the valve body, in order to secure the fitting strength of the concave portions, besides, in order to prevent damage to the rigidity of the valve body and the generation of a gap between the valve body and the valve seat, the study is made on the arrangement of the concave portions and the groove parts leaving spaces around the concave portions so that the concave portions and the groove parts do not connect. By intentionally and continuously forming the concave portions and the groove parts in the upper surface of the valve body, the valve body of the present invention secures a wide space for arranging small hole parts and increases the freedom of degree in arranging the small hole parts.

Support parts 252u, 253u supporting the lower surface 50I of the valve body driving member 50 are arranged on the outside in the radial direction of the concave portions 252, 253 in the upper surface 20u of the valve body 20. Moreover, the support parts 252u, 253u of the embodiment are parts having a height that is aligned with the upper surface 20u. Besides, each small hole part 21 of the valve body 20 is arranged along a central line c of the radius in the upper surface 20u of the valve body 20. In this way, although the valve body 20 of the embodiment is a compact valve body having a diameter of 8 mm, by arranging the support parts 252u, 253u on the outside in the radial direction of the concave portions 252, 253 having the connecting part 27, and by arranging each small hole part 21 along the center in the radius of the valve body, the sealing performance of the lower surface 20I of the valve body 20 and the valve seat surface 15u of the valve seat 15 is enhanced, and the decrease in the fitting strength of the concave portions 252, 253 and the influence of the decrease in the rigidity of the valve body 20, which are caused by the arrangement of the connecting part 27, are reduced.

Furthermore, a polyphenylene sulfide resin is used for the material of the valve body 20 of the embodiment, and a nylon resin is used for the material of the valve body driving member 50. By using the polyphenylene sulfide resin which has high formability and excellent abrasion resistance for the material of the valve body 20 that influences the adjustment accuracy of the refrigerant flow rate, and on the other hand, using inexpensive nylon resin in the valve body driving member 50 which does not require the formation accuracy as the valve body 20, the cost efficiency is increased, and the demerits caused by the arrangement of the connecting part 27 are also reduced.

In the lower surface 20I of the valve body 20, error absorbing parts 261, 262, 263, 264, 265, which are concave portions using each small hole part 21 as a center in the radial direction and having a diameter greater than the hole diameter of each small hole part 21, are formed. In the followings, the five error absorbing parts are also generally called "the error absorbing part 26". By each small hole part 21 including the error absorbing part 26 respectively, slight deviation in the rotation angle of the valve body 20 is absorbed, and the accuracy of the flow rate adjustment by the small hole part 21 is improved.

Here, the diameter of the error absorbing part 26 is determined in accordance with the hole diameter of the corresponding small hole part 21. That is, in the small hole part having a small hole diameter, an error absorbing part having a corresponding small diameter is formed; in the small hole part having a large hole diameter, an error absorbing part having a corresponding large diameter is formed, and the area efficiency of the lower surface 20I of the valve body is increased. As a result, the number of small hole part possible to be formed in the valve body 20 is maximized. Moreover, the depth of the error absorbing part 26 is formed deeper than the hole diameter of the corresponding small hole part 21, and the flow rate of the small hole part is not limited by the error absorbing part 26.

(Operation of Refrigerant Valve Device)

Figure 8A:
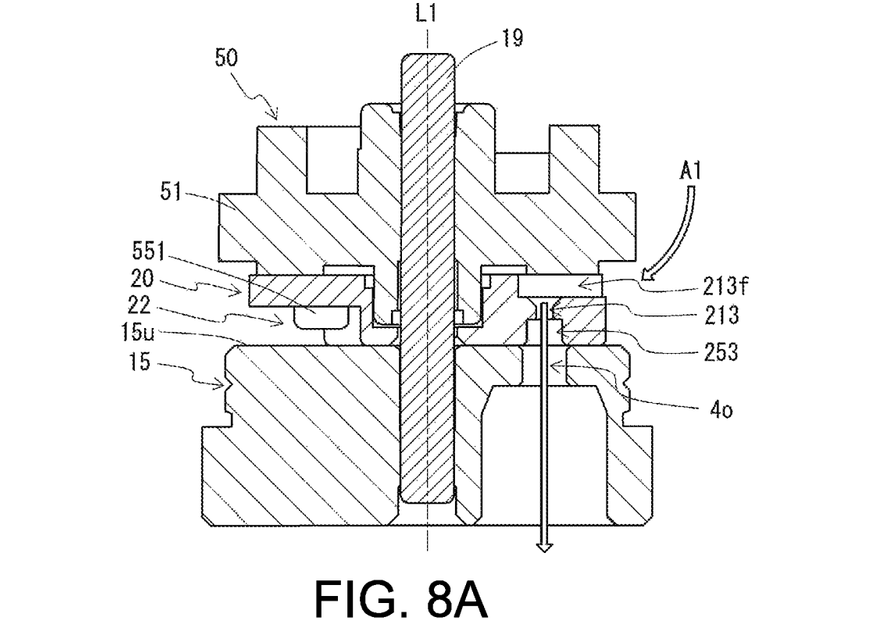
FIGS. 8A and 8B are a cross-sectional side view showing a communicating state of a refrigerant valve device.
Figure 8B:
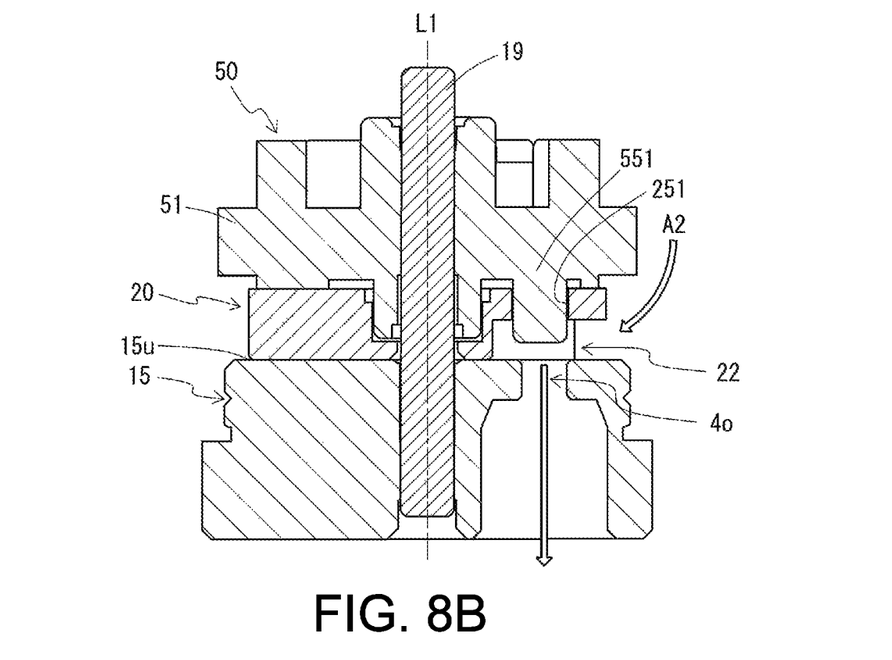

FIGS. 8A and 8B are cross-sectional side view showing a communicating state of the refrigerant valve device 1. Using the small hole part 213 as an example, FIG. 8A shows a state in which a flow channel A1 that is a refrigerant flow channel passing through the small hole part 21 is formed, and FIG. 8B shows a state in which a flow channel A2 that is a refrigerant flow channel passing through the cutout part 22 is formed.

When the stepping motor 60 is driven by an external control device, the driving force is transmitted to the valve body driving member 50 through the pinion 66 and the teeth portion 51 of the valve body driving member 50. Then, when the valve body driving member 50 rotates in the circumferential direction, the valve body 20 also rotates on the valve seat surface 15u in the same direction as the valve body driving member 50. Here, as shown in FIG. 8A, when the error absorbing part 26 formed in the lower surface 20I of the valve body 20 overlaps with the outflow port 4o in the axis line L1 direction, the flow channel A1 which sequentially communicates, from the valve chamber 36, with the outflow port 4o via the groove part 21f, the small hole part 21 and the error absorbing part 26 is formed. The flow rate of the refrigerant is determined in accordance with the hole diameter of each small hole part 21 in a state that the flow channel A1 is formed.

In addition, as shown in FIG. 8B, when the cutout part 22 of the valve body 20 and the outflow port 4o are overlapped in the axis line L1 direction, the flow channel A2 from the valve chamber 36 to the outflow port 4o through the cutout part 22 is formed. Because the cutout part 22 of the embodiment expose the entire outflow port 4o within the valve chamber 36, the flow channel A2 causes the refrigerant to flow out at a maximum flow rate determined by the refrigerant valve device 1.

Figure 9:
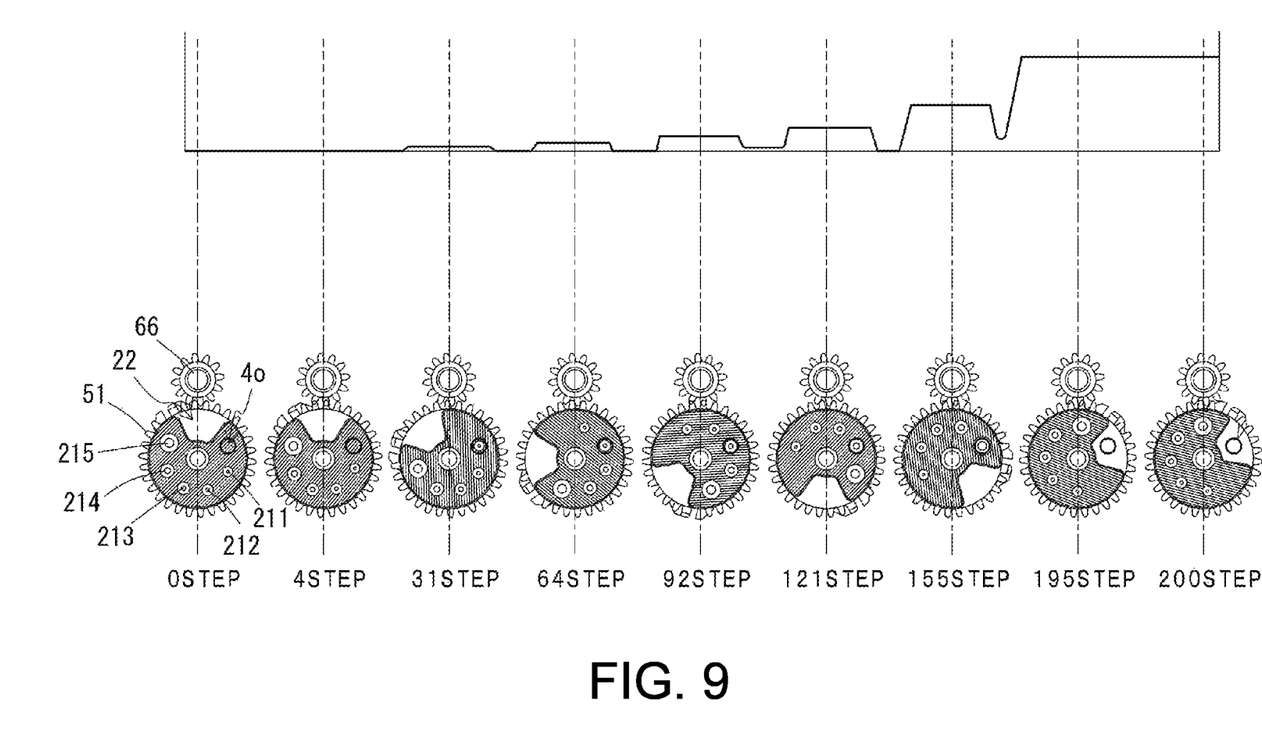
FIG. 9 is an explanatory drawing for controlling operation of a refrigerant flow rate based on a refrigerant valve device.

FIG. 9 is an explanatory drawing of the control operation of the refrigerant flow rate. The graph on the upper side in FIG. 9 shows the flow rate of the refrigerant which circulates through the refrigerant valve device 1, in which the vertical axis represents the circulation amount, and the horizontal axis represents the number of driving steps of the stepping motor 60. Moreover, in FIG. 9, the valve body 20 receives the driving force of the stepping motor 60 from an origin position (0 step) and rotates in a CCW (counter clockwise) direction. In the following description, among the rotation direction of the stepping motor 60, the rotation direction which causes the valve body 20 to rotate in the CCW direction is set as a forward rotation direction, and the rotation direction which causes the valve body 20 to operate in the CW (clockwise) direction is set as a reverse rotation direction. The graph on the lower side in FIG. 9 shows a relation between the arrangement state of the valve body 20 and the position of the outflow port 4o when the stepping motor 60 is driven by a predetermined step number in the forward rotation direction. Next, the control operation of the refrigerant flow rate by the refrigerant valve device 1 is described with reference to FIG. 9.

First, when the valve body 20 is in the origin position, the arm portion 52 of the valve body driving member 50 is in a state of abutting against the rotation limitation part 67 of the rotor 61 in the CW direction. Therefore, for the valve body 20 in the origin position, the rotation toward the CW direction is limited. At this moment, the outflow port 4o is closed by a flat surface portion in the lower surface 20I of the valve body other than the portion in which the cutout part 22 or the error absorbing part 26 is formed, and the circulation of the refrigerant is blocked.

When the stepping motor 60 is driven by 4 steps in the forward rotation direction from the state that the valve body 20 is in the origin position, the valve body 20 rotates slightly toward the CCW direction, but the outflow port 4o is still closed by the flat surface portion in the lower surface 20I of the valve body, and the circulation of the refrigerant is blocked.

When the stepping motor 60 is driven by 31 steps in the forward rotation direction from the state that the valve body 20 is in the origin position, the valve body 20 is arranged to an angle at which the small hole part 211 overlaps with the outflow port 4o in the axis line L1 direction. This is the state shown in FIG. 8A, and the flow channel A1 is formed. Among the small hole part 21 included in the valve body 20, the small hole part 211 has the smallest hole diameter, and the refrigerant valve device 1 causes the refrigerant to circulate at a minimum flow rate.

When the stepping motor 60 is driven by 64 steps in the forward rotation direction from the state that the valve body 20 is in the origin position, the valve body 20 is arranged to an angle at which the small hole part 212 overlaps with the outflow port 4o in the axis line L1 direction. The position relation is also the state shown in FIG. 8A, and the flow channel A1 is formed. Among the small hole part 21 included in the valve body 20, the small hole part 212 has a hole diameter larger than the hole diameter of the small hole part 211, and the refrigerant valve device 1 causes the refrigerant to circulate at a flow rate higher than the flow rate in the case of the small hole part 211.

When the stepping motor 60 is driven by 92 steps in the forward rotation direction from the state that the valve body 20 is in the origin position, the valve body 20 is arranged to an angle at which the small hole part 213 overlaps with the outflow port 4o in the axis line L1 direction. The position relation is also the state shown in FIG. 8A, and the flow channel A1 is formed. Among the small hole part 21 included in the valve body 20, the small hole part 213 has a hole diameter larger than the hole diameter of the small hole part 212, and the refrigerant valve device 1 causes the refrigerant to circulate at a flow rate higher than the flow rate in the case of the small hole part 212.

When the stepping motor 60 is driven by 121 steps in the forward rotation direction from the state that the valve body 20 is in the origin position, the valve body 20 is arranged to an angle at which the small hole part 214 overlaps with the outflow port 4o in the axis line L1 direction. The position relation is also the state shown in FIG. 8A, and the flow channel A1 is formed. Among the small hole part 21 included in the valve body 20, the small hole part 214 has a hole diameter larger than the hole diameter of the small hole part 213, the refrigerant valve device 1 causes the refrigerant to circulate at a flow rate higher than the flow rate in the case of the small hole part 213.

When the stepping motor 60 is driven by 155 steps in the forward rotation direction from the state that the valve body 20 is in the origin position, the valve body 20 is arranged to an angle at which the small hole part 215 overlaps with the outflow port 4o in the axis line L1 direction. The position relation is also the state shown in FIG. 8A, and the flow channel A1 is formed. Among the small hole part 21 included in the valve body 20, the small hole part 215 has the largest hole diameter, and the refrigerant valve device 1 causes the refrigerant to circulate at a flow rate larger than the flow rate in the case of the small hole part 214.

When the stepping motor 60 is driven by 195 steps in the forward rotation direction from the state that the valve body 20 is in the origin position, the valve body 20 is arranged to an angle at which the cutout part 22 overlaps with the outflow port 4o in the axis line L1 direction. This is the state shown in FIG. 8B, and the flow channel A2 is formed. The cutout part 22 exposes the entire outflow port 4o to the valve chamber 36, and the refrigerant valve device 1 causes the refrigerant to circulate at the maximum flow rate.

When the stepping motor 60 is driven by 200 steps in the forward rotation direction from the state that the valve body 20 is in the origin position, the arm portion 52 of the valve body driving member 50 abuts against the rotation limitation part 67 of the rotor 61 in the CCW direction, and a further rotation of the valve body 20 toward the CCW direction is limited. Even in this angle position, the cutout part 22 of the valve body 20 overlaps with the outflow port 4o in the axis line L1 direction, and the refrigerant valve device 1 causes the refrigerant to circulate at the maximum flow rate.

In the above, the embodiment of the present invention is described in detail, but the present invention is not limited to the embodiment, and various modifications can be made within a scope not departing from the spirit of the present invention. For example, the fitting part on the valve body 20 side in the embodiment is the concave portion 25; however, even when the fitting part is the convex portion, a space for increasing the number of the small hole part can still be secured by arranging the connecting part between the convex portion and the groove part.

What is claimed is:

1. A valve device, comprising:
 a drive source;
 a valve body driving member rotated by a driving force from the drive source;
 a valve body fixed to one end surface of the valve body driving member in an axial direction and rotating in a circumferential direction integrally with the valve body driving member; and
 a valve seat having a valve seat surface, wherein the valve body is disposed adjacent to the valve seat surface, wherein
 when a surface of the valve body driving member facing the valve body is set as a lower surface of the valve body driving member, a surface of the valve body facing the valve body driving member is set as an upper surface of the valve body, and an end surface, that is opposite to the upper surface of the valve body and is disposed on the valve seat surface, is set as a lower surface of the valve body,
 fitting parts, which are fitted to one another, are formed in the lower surface of the valve body driving member and the upper surface of the valve body,
 the valve body has hole parts formed therethrough in the axial direction of the valve body,
 opening parts, that are inflow ports or outflow ports of a fluid, are formed in the valve seat surface of the valve seat,
 groove parts, that are flow channels linking from an outer peripheral surface of the valve body to the hole parts, are formed in the upper surface of the valve body, and
 the fitting parts and the groove parts of the valve body on a side of the valve body have connecting parts that are portions where the fitting parts and the groove parts are formed continuously in the upper surface of the valve body without being separated by other elements constituting the valve body.

2. The valve device according to claim 1, wherein at least any one of the valve seat surface of the valve seat and the lower surface of the valve body is ground.

3. The valve device according to claim 1, wherein the drive source is a motor,
the valve body driving member is a gear member in which a teeth portion is formed in an outer peripheral surface of the valve body driving member, and
a driving force from the drive source is decelerated and transmitted to the valve body driving member.

4. The valve device according to claim 1, wherein a polyphenylene sulfide resin is used in a material of the valve body, and
a nylon resin is used in a material of the valve body driving member.

5. The valve device according to claim 1, wherein the valve body has a plurality of hole parts with different hole diameters, and
the groove parts are formed in each of the hole parts in the upper surface of the valve body.

6. The valve device according to claim 5, wherein the concave portions that are the fitting parts on the side of the valve body have a plurality of the groove parts and the connecting parts.

7. The valve device according to claim 5, wherein any one of the plurality of hole parts is arranged in a position which substantially becomes a radius center on the upper surface of the valve body.

8. The valve device according to claim 1, wherein error absorbing parts, which are concave portions that use the hole parts as radial centers and have diameters larger than hole diameters of the hole parts, are formed in the lower surface of the valve body.

9. The valve device according to claim 8, wherein the valve body has a plurality of the hole parts with different hole diameters,
the groove parts are formed in each of the hole parts in the upper surface of the valve body, and
the diameter of each error absorbing part is determined in accordance with the hole diameter of the corresponding hole part.

10. The valve device according to claim 8, wherein a depth of the error absorbing part is deeper than the hole diameter of the corresponding hole part.

11. The valve device according to claim 1, wherein the fitting parts are constituted by concave portions and convex portion that are fitted one another.

12. The valve device according to claim 11, wherein the fitting parts of the valve body are concave portions.

13. The valve device according to claim 12, wherein the concave portions that are the fitting parts of the valve body overlap partially with the groove parts.

14. The valve device according to claim 12, wherein a diameter of the valve body is less than 10 mm,
the hole parts of the valve body have five different hole diameters,
the groove parts are formed in each of the hole parts in the upper surface of the valve body,
the fitting parts are constituted by a plurality of groups of concave portions and convex portions that are fitted to one another,
at least one of the plurality of concave portions that are the fitting parts on the side of the valve body has the connecting part,
a cutout part that is a flow channel obtained by cutting the lower surface of the valve body from the outer peripheral surface of the valve body to a center side in the radial direction is formed in the lower surface of the valve body, and
the cutout part has a size capable of exposing all the opening parts in the valve seat surface when the valve body reaches a predetermined angle position, and
the valve body has, in the lower surface thereof, a flat surface part which closes all the opening parts in the valve seat surface.

15. The valve device according to claim 12, wherein a cutout part that is a flow channel obtained by cutting the lower surface of the valve body from the outer peripheral surface of the valve body to a center side in a radial direction is formed in the lower surface of the valve body, and
the cutout part has a size capable of exposing all the opening parts in the valve seat surface when the valve body reaches a predetermined angle position.

16. The valve device according to claim 15, wherein the fitting parts are constituted by a plurality groups of concave portions and convex portions that are fitted to one another,
at least one of the plurality of the concave portions that are the fitting parts on a side of the valve body has the connecting part,
among the plurality of concave portions that are the fitting parts of the valve body, the concave portions arranged in the upper surface of the valve body and in an upper part of a forming range of the cutout part are through holes penetrating to a side of the cutout part, and
the convex portions of the valve body driving member, which are fitted to the concave portions that are the through holes, are caulked on the side of the cutout part and are fixed to the valve body.

17. The valve device according to claim 12, wherein the fitting parts are constituted by a plurality of groups of concave portions and convex portions that are fitted to one another, and
at least one of the plurality of concave portions that are the fitting parts on the side of the valve body has the connecting part of the valve body.

18. The valve device according to claim 17, wherein support parts, which support the lower surface of the valve body driving member, are arranged on an outside in a radial direction of the concave portions which are formed in the upper surface of the valve body and are the fitting parts of the valve body having the connecting parts.

19. The valve device according to claim 17, wherein a plurality of groups of concave portions and convex portions constituting the fitting parts are arranged at unequal intervals in the circumferential direction of the valve body driving member and the valve body.

* * * * *